W. S. Wilcox,
Fish Net.
N° 83,429. Patented Oct. 27, 1868.
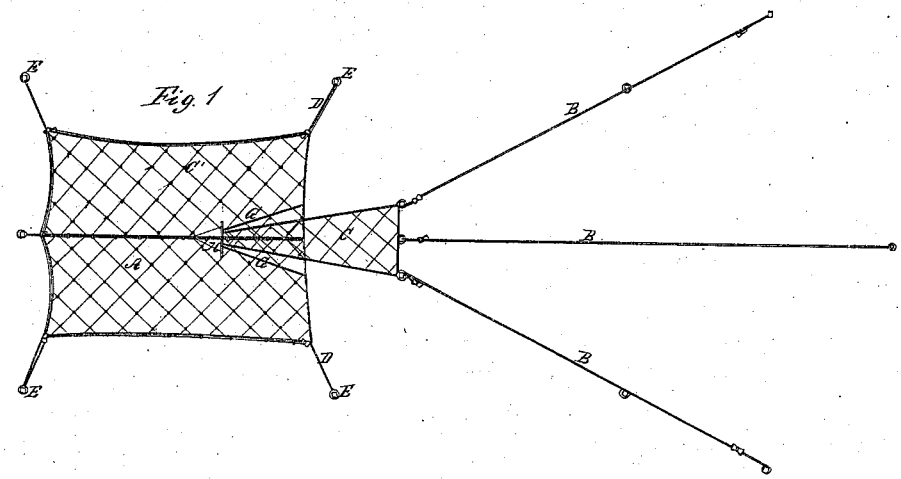
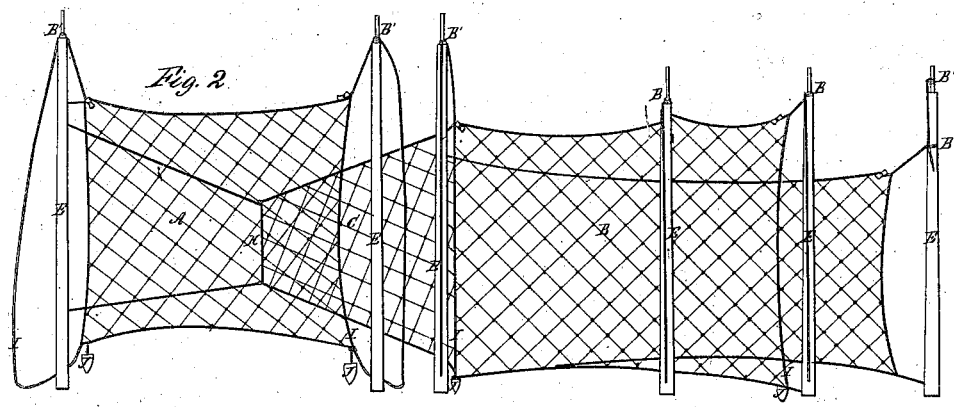
Witnesses:
J. W. Burridge
Frank S. Alden
Inventor:
W. S. Wilcox.

UNITED STATES PATENT OFFICE.

WILLIAM S. WILCOX, OF WELLINGTON, OHIO.

Letters Patent No. 83,429, dated October 27, 1868.

TRAP-NET.

The Schedule referred to in these Letters Patent and making part of the same.

*To all whom it may concern:*

Be it known that I, WILLIAM S. WILCOX, of Wellington, in the county of Lorain, and State of Ohio, have invented certain new and useful Improvements in Pound Trap-Nets; and I do hereby declare that the following is a full and complete description of the same, reference being had to the accompanying drawings, making part of this specification, in which—

Figure 1 is a top view of the net.
Figure 2 is a side view.

Like letters of reference refer to like parts in the different views.

The nature of this invention consists in the connecting the pound-section of the net to the trap, so that the two, when thus connected, are more easily and softly handled, and the trapped fish more securely confined than is done in the ordinary net. The improvement also consists in the manner of setting the net, without the use of stakes or poles, when said net is required to be set in deep water.

The construction of the net, and manner of setting the same, are as follows, viz:

In fig. 1, A represents the pound-section of the net, which is constructed of netting, and of the usual shape and size as nets in ordinary use.

B is the trail or lead of the net, and which is connected to the pound by the funnel or throat C.

The usual manner of connecting the two is as follows: The inner end of the funnel is drawn into the pound, through an opening made in the side, and therein secured, as shown in the drawing.

The sides of the opening are made to fit close to the sides of the funnel, by drawing taut the netting by the cords D, by which the end of the pound is kept extended, and secured to the stakes E.

It not unfrequently happens that the sides of the opening, enclosing the funnel, become loose, in consequence of the slackening of the cords, or the yielding of the posts from a vertical position, the result of which is to cause an opening between the sides of the funnel and the aperture in the side of the pound, through which the fish often escape, either while the net is set, or on the pound being hauled up for taking out the fish. In this way great loss is sometimes incurred, though much care may be exercised in setting the net, or hauling the same.

In order to guard against this loss, I construct a supplementary funnel, G, proceeding from the mouth of the funnel C, to which it is attached, outward, and back to the opening in the side of the pound. To the sides of this opening, the wide end of the funnel is closely attached.

By this arrangement, it will be seen that the funnel or throat C is enclosed by the funnel G, thereby presenting a wall of netting from the opening to the mouth H. Hence, should the sides of the opening become loose and fall away from the throat C, no opening will be made through which the fish can escape from the pound; and so the hauling up the pound, for the purpose of taking out the fish, and the slackening of the ropes D can in no way disturb the security of the net, it being all close and tight at the mouth, though unconnected to the throat at any other point.

The net, as above described, is shown as being secured in place by the stakes E, to which the net is lashed. This manner of securing the net is practicable only in water of little depth and of a soft bottom. It is sometimes necessary to set it in water so deep that poles of sufficient length are difficult to be obtained, or where the bottom is of such a nature that the stakes cannot be driven.

Instead of the stakes, I propose to use heavy weights, J, to which the lower cords of the net are fastened. These weights are sunk at the proper places, and the net drawn down to them by a rope, I, which is run through a ring attached to the weight. It will be obvious that a double rope, or rather two ropes will be required for this purpose, one for drawing down the net, and the other for the purpose of hauling it up, as is always practised when stakes are used, and which is represented in fig. 2, in which it will be seen that the rope is run through the lower end of the stake, a hole being provided for that purpose. Thus the net is drawn down by one line, and hauled up by the other, all being secured when the net is set to the upper end of the stake, as seen at B'.

When no stakes are used, the ends of the lines or ropes are secured to buoys, and which also serve to give tension to the net, and thereby keep it in proper shape.

By the use of weights, instead of stakes, for setting the net, it can be as well set entirely under the water, or partially above, as is usually practised. Should it be set under the water, a cover, C', is required, as shown in fig. 1, thereby closing the pound on every side, so that the fish cannot escape over the top, which they would do were the pound set below the surface of the water without such cover.

The manner of trapping the fish is as follows: The net is set as shown in fig. 1, with the spreading, diverging wings B toward the shore, in shallow water. The instinct of the creatures leads them from the shallow waters of the beach, when they may have wandered outward to deep shoals. As they move outward, they are guided by the wings down to the throat C, through which they follow along into the pound, and never return.

The fish are taken out from the pound by throwing back a portion at a time of the covering, and, on releasing the cords, draw up the pound, slowly and carefully, until the fish are within reach, which are then seized and cast into the boat. This operation is done without disturbing the throat and wings of the trap, the pound only being raised.

What I claim as my improvement, and desire to secure by Letters Patent, is—

1. The supplementary funnel G, and cover C', as arranged, in combination with the funnel C and pound A, in the manner as and for the purpose set forth.

2. The use of weights, J, for sinking and anchoring the net, in combination with buoys, in the manner substantially as described.

WM. S. WILCOX.

Witnesses:
J. H. BURRIDGE,
FRANK S. ALDEN.